United States Patent
Takita

(10) Patent No.: US 8,371,789 B2
(45) Date of Patent: Feb. 12, 2013

(54) HOLE PLUG

(75) Inventor: Takashi Takita, Utsunomiya (JP)

(73) Assignee: Nifco Inc., Yokohama-Shi (JP)

( * ) Notice: Subject to any disclaimer, the term of this patent is extended or adjusted under 35 U.S.C. 154(b) by 111 days.

(21) Appl. No.: 12/998,290

(22) PCT Filed: Oct. 7, 2009

(86) PCT No.: PCT/JP2009/005201
§ 371 (c)(1),
(2), (4) Date: Jun. 9, 2011

(87) PCT Pub. No.: WO2010/041435
PCT Pub. Date: Apr. 15, 2010

(65) Prior Publication Data
US 2011/0233950 A1   Sep. 29, 2011

(30) Foreign Application Priority Data
Oct. 8, 2008   (JP) .................................. 2008-261574

(51) Int. Cl.
*F16B 19/00*   (2006.01)
(52) U.S. Cl. ........................... 411/508; 220/787
(58) Field of Classification Search .......... 411/508–510; 220/787, 789, 790, 295
See application file for complete search history.

(56) References Cited

U.S. PATENT DOCUMENTS

| | | | |
|---|---|---|---|
| 3,233,775 A * | 2/1966 | Bozek | 220/787 |
| 3,279,643 A * | 10/1966 | Amesbury et al. | 220/234 |
| 3,372,960 A * | 3/1968 | Fisher | 384/439 |
| 3,635,234 A * | 1/1972 | Dawson | 137/68.25 |
| 4,334,632 A * | 6/1982 | Watanabe | 220/787 |
| 4,399,927 A * | 8/1983 | Yaotani et al. | 220/789 |
| 4,604,474 A * | 8/1986 | Kumobayashi et al. | 556/7 |
| 4,998,642 A * | 3/1991 | Kraus | 220/782 |
| 6,021,917 A * | 2/2000 | Lovell et al. | 220/782 |
| 6,296,136 B1 * | 10/2001 | Huet | 220/233 |
| 7,108,017 B2 * | 9/2006 | Kraus | 138/89 |
| 7,578,413 B2 * | 8/2009 | Kraus | 220/789 |
| 7,997,437 B2 * | 8/2011 | Jatzke et al. | 220/359.4 |

FOREIGN PATENT DOCUMENTS

| | | |
|---|---|---|
| JP | S61-059067 | 3/1986 |
| JP | H03-049465 | 8/1991 |
| JP | H07-071601 | 3/1995 |
| JP | H09-024944 | 1/1997 |
| JP | 2004-162808 A | 6/2004 |

OTHER PUBLICATIONS

Japan Patent Office, "Office Action for JP 2008-261574", Aug. 28, 2012.

\* cited by examiner

*Primary Examiner* — Gary Estremsky
(74) *Attorney, Agent, or Firm* — Manabu Kanesaka

(57) ABSTRACT

While a high pullout force is being achieved, when a hole plug is demolded from a mold, a load on a locking claw is reduced. A leg portion 3 of a hole plug 1 includes an inner tube 11, an outer tube 12 surrounding the inner tube, ribs 15 interconnecting the inner and outer tubes, and locking claws 14 provided on an outer circumferential surface of the outer tube and locked in a circumferential border thereof when the leg portion is inserted into a hole 22 of a body panel 21. The ribs are disposed corresponding to positions of the locking claws, and are structured so as to be tilted relative to a radial direction of the hole plug in a case of being viewed from an insertion direction of the leg portion.

4 Claims, 5 Drawing Sheets

HOLE PLUG

RELATED APPLICATIONS

The present application is National Phase of International Application No. PCT/JP2009/005201 filed Oct. 7, 2009, and claims priority from Japanese Application No. 2008-261574, filed Oct. 8, 2008, the disclosure of which is hereby incorporated by reference herein in its entirety.

FIELD OF TECHNOLOGY

The invention relates to a hole plug for blocking a hole provided in a plate-like member, such as a body panel of an automobile and the like.

BACKGROUND ART

Conventionally, in the body panel of the automobile, holes, which are used for operation and inspection, wiring of wire harnesses and the like, attachment of members and the like, are provided. These holes are generally blocked by a resin hole plug in order to prevent water and the like from entering when they are not in use. Regarding the hole plug, various technologies have been developed for the purpose of placing workability, an improvement of water stop (waterproof) ability, or the like.

For example, the following hole plug is well-known. The hole plug is provided with a blind hole in a center, and also includes an insertion portion wherein locking claws locked in an attachment hole are provided on a whole outer circumference, and a non-insertion portion connected to an upper end of this insertion portion. The insertion portion includes an annular arc-like groove provided on a circumferential border of the non-insertion portion, and in the arc-like groove, dividing wall portions extending along a radial direction disposed in a circumferential direction with a predetermined interval, are provided (see Patent Document 1).

Also, for example, a hole plug comprising a head portion and a leg portion projected from a rear surface of this head portion and inserted into the hole of the plate-like member, is well-known. The leg portion is formed so as to have a tube shape by plural standing plates which are plate-like and respectively stand up from the rear surface of the head portion, and on a base end portion of each standing plate portion, an engaging step portion, which clamps a circumferential border portion of the hole of the plate-like member in cooperation with the head portion, is formed. On the inside of each standing plate portion, a supporting portion, comprising a wave-like plate material controlling flexure to the inward of a radial direction thereof, is provided (see Patent Document 2).

Patent Document 1: Japanese Published Unexamined Patent Application No. S61-59067 (Japan)

Patent Document 2: Japanese Published Unexamined Patent Application No. 2004-162808 (Japan)

SUMMARY OF THE INVENTION

Problems to be Solved by the Invention

However, in prior art described in the above-mentioned Patent Document 1, the dividing wall portion provided in the arc-like groove operates as a rib, so that at a time of attachment of the hole plug, an excessive deformation of the insertion portion is prevented. Also, after the attachment, a high pullout force (retaining force for preventing the hole plug from coming out of the hole) is achieved, and there is an advantage that a water stop ability is improved by closely contacting the insertion portion with the attachment hole. However, since the above-mentioned dividing wall portion is provided in a linear fashion along a radial direction of the hole plug, the locking claw around the dividing wall portion is difficult to be deformed inwardly. Accordingly, if at a time of manufacturing the hole plug, a mold is pulled out by a force (specifically, after molding of the hole plug, while the locking claw is elastically being deformed, the locking claw is removed from the mold), in some situations, an excessive force acts on the locking claw, so that there was a problem that the locking claw might be damaged.

With regard to this point, in prior art described in the above-mentioned Patent Document 2, since the supporting portion (which corresponds to the above-mentioned dividing wall portion) comprises the wave-like plate material, due to a spring ability of this plate material, when the mold is pulled out by a force, a flexure force heading to the inward of the radial direction can be controlled, so that there is an advantage that the locking claw is protected. However, in order to fulfill a function thereof, it is necessary for the wave-like supporting portion to be ensured so as to have a relatively large size in a longitudinal direction. Thereby, an interval between the standing plate portion and a support pillar portion also needs to be ensured widely to a degree in which the supporting portion can be housed, so that a degree of freedom of the design of the hole plug is undermined, and there was a problem that downsizing thereof was inhibited. Also, in the prior art of the Patent Document 2, the standing plate portion, closely contacting an inner circumferential surface of the hole of the plate-like member, has a structure of being disposed with plural numbers at a predetermined interval in a circumferential direction, so that there was a problem that ensuring a high water stop ability was difficult.

The present invention is made by considering the above-mentioned problems of the prior art, and an object of the present invention is to provide a hole plug in which while a high pullout force is being achieved, when a molded article is demolded from the mold, a load on the locking claws can be reduced.

Means for Solving the Problems

In order to solve the above-mentioned problems, the first invention is a hole plug (1) comprising a head portion (2), and a leg portion (3) projected from the head portion, and blocking a hole (22) provided in a plate-like member (21) by inserting the above-mentioned leg portion into the hole. The above-mentioned leg portion includes a first wall (11), a second wall (12) facing the above-mentioned first wall, a rib (15) interconnecting the above-mentioned first wall and the above-mentioned second wall, and a locking claw (14) provided on an outer circumferential surface of the above-mentioned second wall, and locked on a circumferential border of the hole when the above-mentioned leg portion is inserted into the above-mentioned hole. The above-mentioned rib is disposed corresponding to a position of the above-mentioned locking claw, and in a case of being viewed from an insertion direction of the above-mentioned leg portion, the rib is structured so as to be tilted relative to a direction heading to a center of the above-mentioned locking claw from a center of the hole plug.

Also, as a second invention, in the case of being viewed from the insertion direction of the above-mentioned leg portion, the above-mentioned rib can be structured so as to be connected relative to the above-mentioned second wall at a position which is offset from the center of the above-mentioned locking claw.

Also, as a third invention, the above-mentioned first wall is connected to the above-mentioned head portion at one end side thereof, and also is connected to the above-mentioned second wall at the other end side thereof. Also, the above-mentioned second wall can be structured so as to have a tube shape.

Also, as a fourth invention, a flange portion (4), which is connected to an upper portion of the above-mentioned second wall, and abuts against the above-mentioned plate-like member when the above-mentioned leg portion is inserted into the above-mentioned hole, can be further provided.

Effect of the Invention

According to the above-mentioned first invention, the rib interconnecting the first wall and the above-mentioned second wall is provided so as to be tilted relative to the direction heading to the center of the locking claw from the center of the hole plug when the rib is viewed from the insertion direction of the leg portion. Accordingly, while a high pullout force of the hole plug is being achieved, a load on the locking claw when the hole plug is demolded from a mold can be reduced. Also, since the rib is easily elastically deformed relative to a pressing force from a locking claw side, there is an advantage that damages on the rib itself can be prevented.

According to the above-mentioned second invention, the locking claw can be easily displaced to an inside (rib side), and loads on the locking claw and the rib when the hole plug is demolded from the mold can be reduced further effectively.

According to the above-mentioned third invention, due to a simple structure, when the leg portion is inserted into the hole of the plate-like member, the outer circumferential surface of the second wall can be closely contacted with an inner circumferential surface of the hole, and a high water stop ability of the hole plug can be achieved.

According to the above-mentioned fourth invention, due to the simple structure, the water stop ability of the hole plug can be enhanced further effectively.

BEST MODES OF CARRYING OUT THE INVENTION

Hereinafter, an embodiment of the present invention will be explained with reference to drawings. Hereinafter, unless there is a special note, the terms "upper" and "lower" showing a direction follow a hole plug 1 shown in FIG. 4 (i.e., a head portion 2 side is an upper side, and a leg portion 3 side is a lower side).

Figure 1:
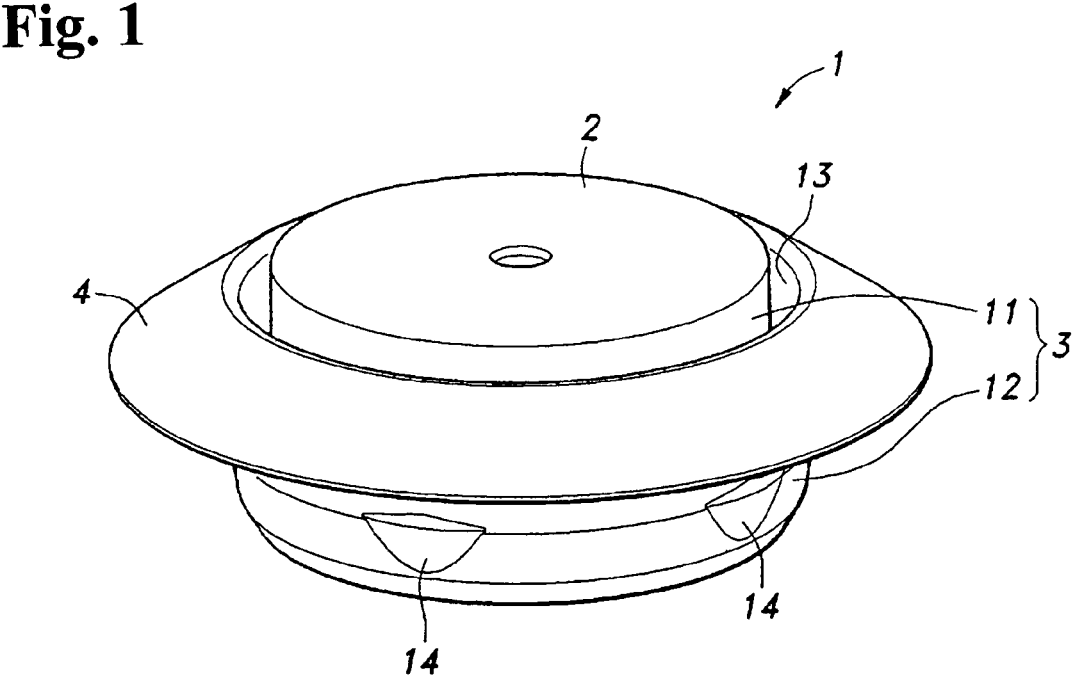
FIG. 1 is a perspective view of a hole plug according to the present invention.
Figure 2:
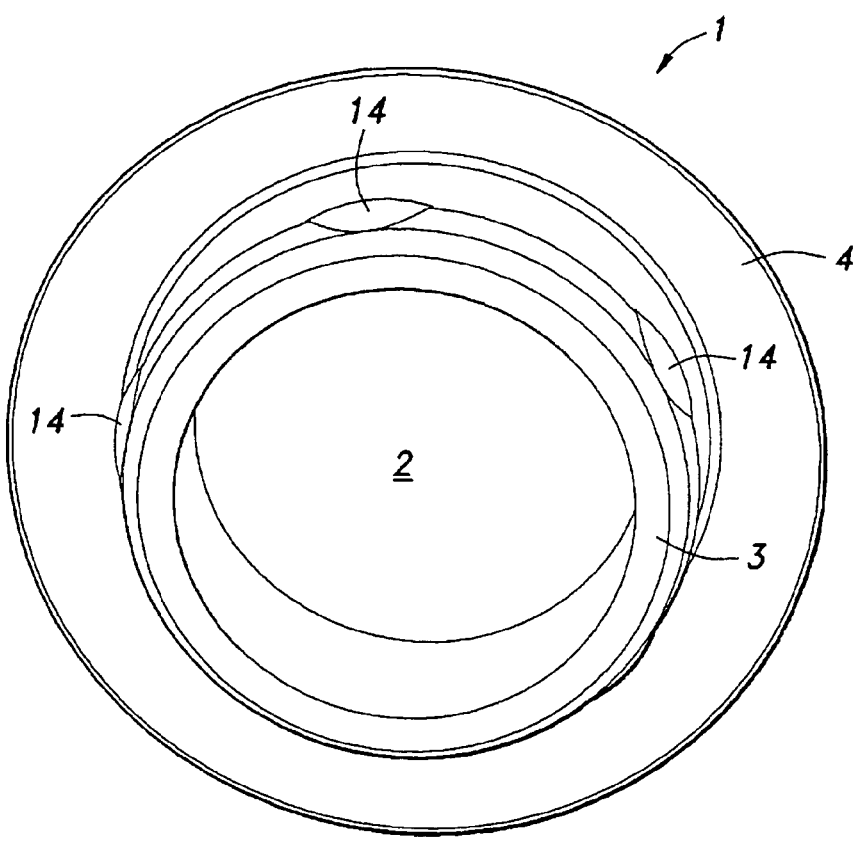
FIG. 2 is a perspective view when the hole plug in FIG. 1 is viewed from a lower side.
Figure 3:
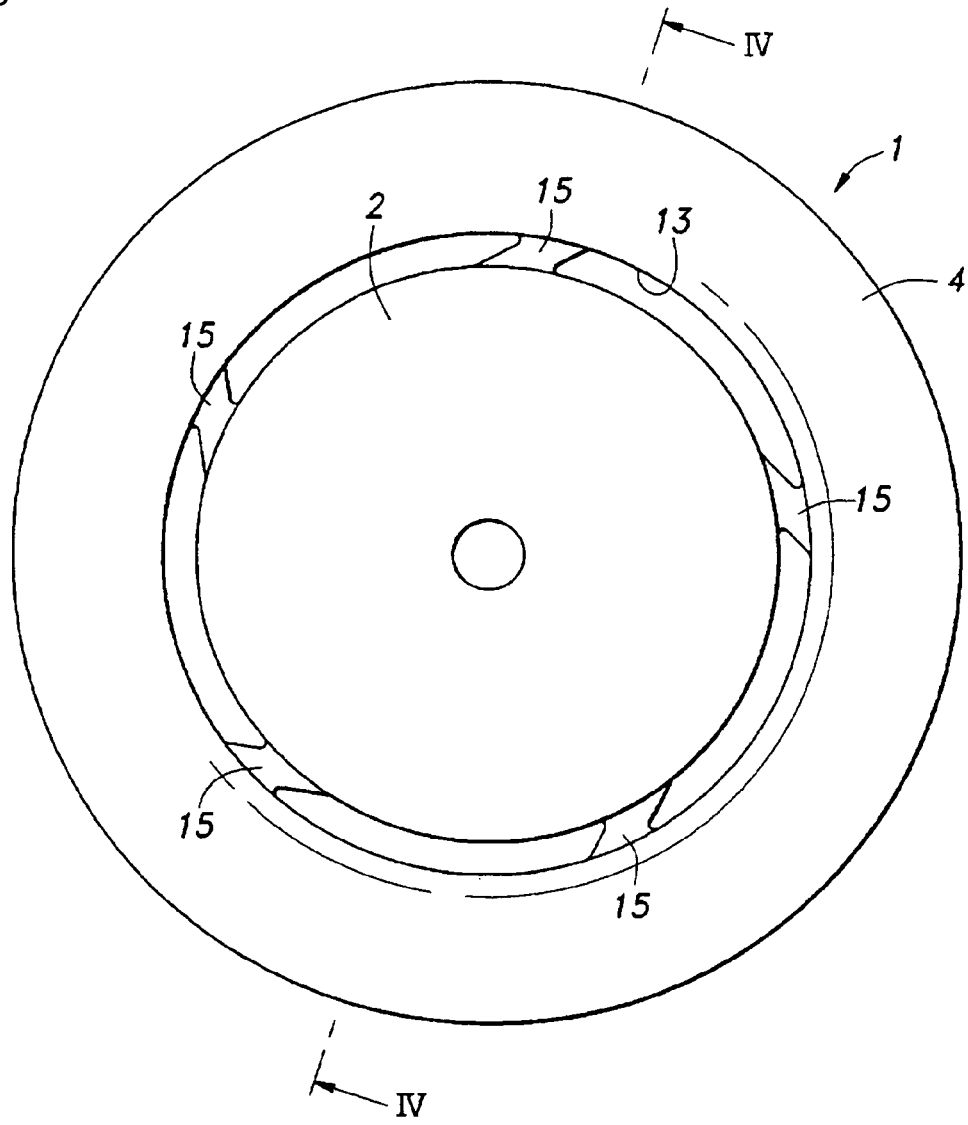
FIG. 3 is a plan view of the hole plug.
Figure 4:
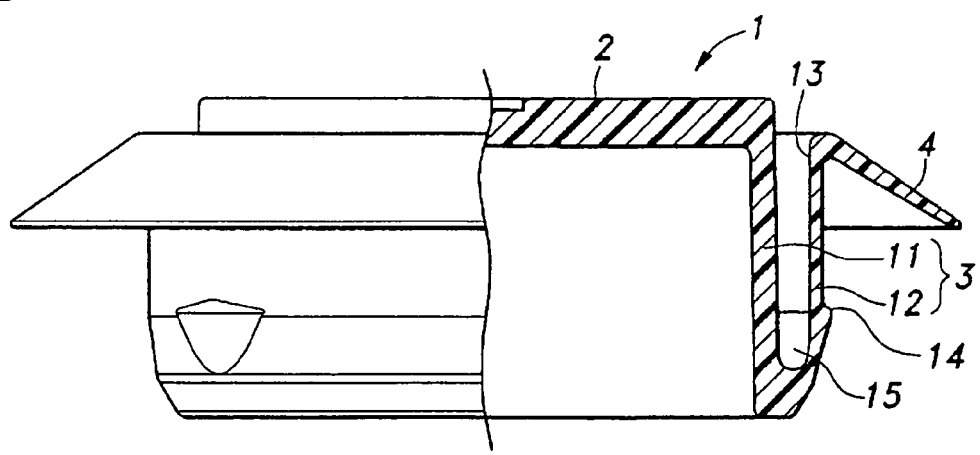
FIG. 4 is a cross-sectional view taken along a line IV-IV in FIG. 3.

FIGS. 1 and 2 are respectively perspective views wherein the hole plug according to the present invention is viewed from the upper side and the lower side; FIG. 3 is a plan view of the hole plug; FIG. 4 is a cross-sectional view taken along a line IV-IV in FIG. 3; and FIG. 5 is a partially enlarged view showing a detailed structure of a locking claw and a rib.

Figure 5:
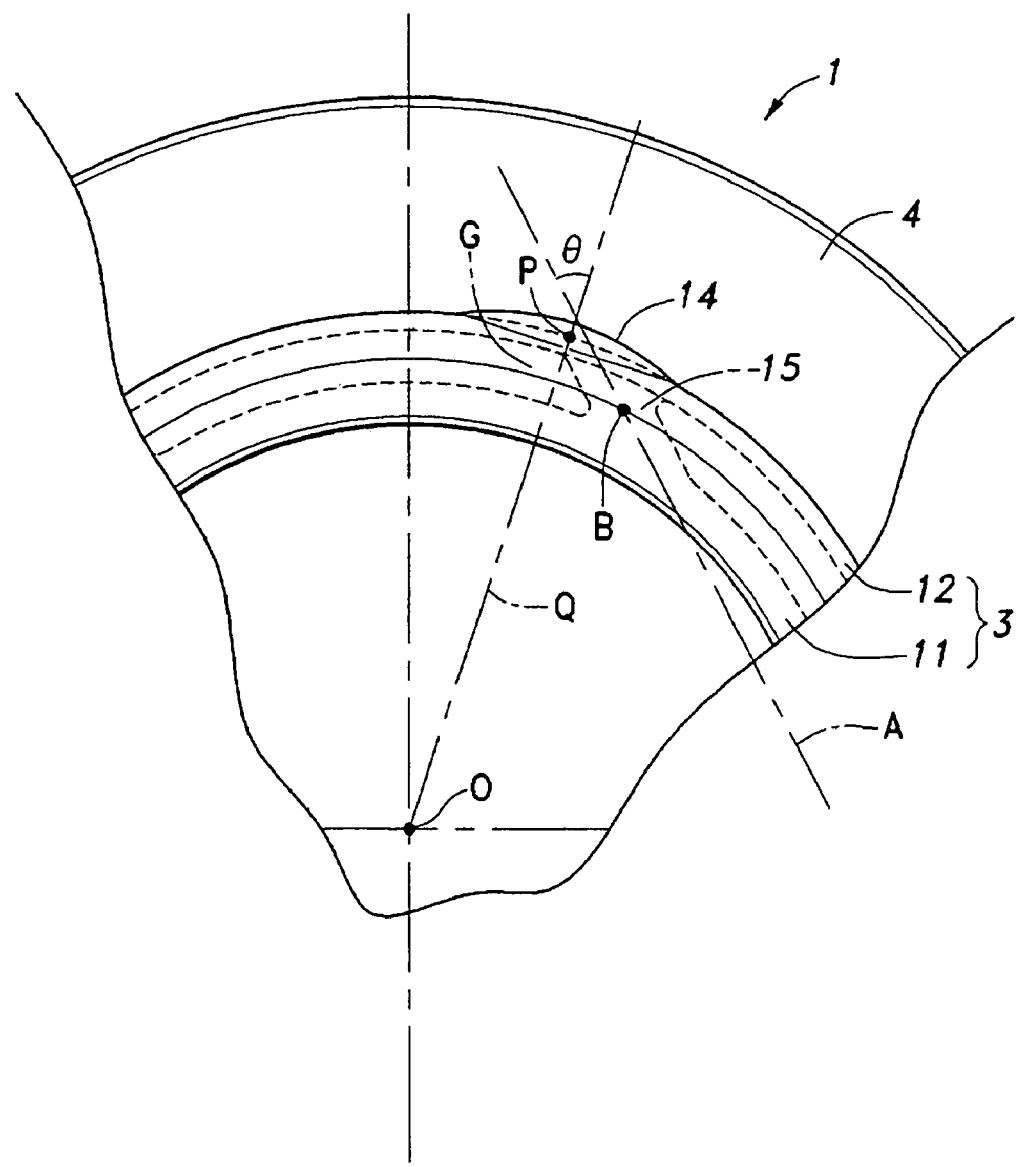
FIG. 5 is a partially enlarged view showing a detailed structure of a locking claw and a rib of the hole plug.

Incidentally, FIG. 5 shows a structure in a case where the hole plug is viewed from the lower side.

Figure 6A:
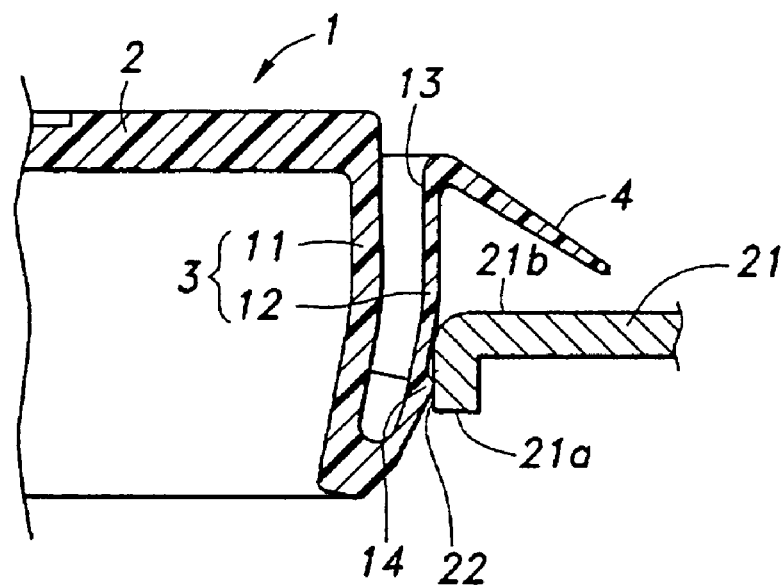
FIGS. 6(A), 6(B) are schematic cross-sectional views showing conditions wherein the hole plug is placed in a body panel.
Figure 6B:
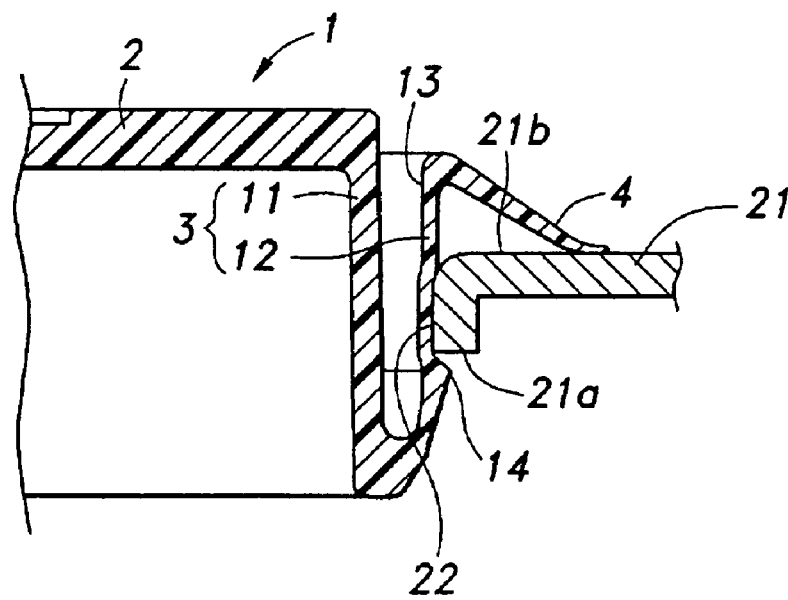

As shown in FIGS. 1 and 2, the hole plug 1 is used for blocking a hole 22 (see FIGS. 6(A), 6(B)) provided in a body panel (plate-like member) 21 of an automobile, and comprises a head portion 2 having a circular flat plate; a leg portion 3 projected downward from a circumferential border of this head portion 2; and a flange portion 4 extending obliquely downward from a circumferential border of this leg portion 3. Each of the portions 2 to 4 is integrally formed by a synthetic resin material.

As shown in FIG. 4, the leg portion 3 includes an inner tube (first wall) 11 connected to a lower surface of the head portion 2; and an outer tube (second wall) 12 surrounding this inner tube 11. The inner tube 11 and the outer tube 12 have an approximately cylindrical shape, and lower end portions of both the inner tube 11 and the outer tube 12 are connected. Thereby, the leg portion 3 includes an approximately U-shaped cross-sectional surface, and an annular groove 13 is formed around the head portion 2. A size of an outer diameter of the outer tube 12 is set based on a diameter of a hole wherein the leg portion 3 is inserted. Also, on an outer circumferential surface of the outer tube 12, locking claws 14, which are locked in a circumferential border of the hole 22 thereof when the hole plug 1 is inserted into the hole 22 (see FIGS. 6(A), 6(B)), are projected. The locking claws 14 are disposed with plural numbers (here, five) in a circumferential direction with an approximately equal interval.

Inside the annular groove 13, ribs 15, interconnecting an outer circumferential surface of the inner tube 11 and an inner circumferential surface of the outer tube 12 are provided with plural numbers (here, five). Each rib 15 is disposed corresponding to a position of each locking claw 14, and also as shown in FIG. 5, the rib 15 is connected to a rear side of a position wherein the locking claw 14 is projected relative to the outer tube 12. In a plan view (a case of being viewed from an insertion direction of the leg portion 3 relative to the hole), in each rib 15 extending in an approximately linear fashion between the inner tube 11 and the outer tube 12, a center line A thereof is provided in such a way as to be tilted relative to an axis line Q (a radial direction) heading to a center P of the locking claw 14 from a center O of the hole plug 1. In the present embodiment, an angle θ showing the degree of a tilt of the rib 15 is set at 45°. Also, in the plan view, a center B of each rib 15 is connected relative to the outer tube at a position which is offset to one side of a circumferential direction from the center P of the locking claw 14.

As shown in FIG. 4, in the flange portion 4, an inner circumferential border is connected to an upper end border of the outer tube 12, and when the leg portion 3 is inserted into the hole 22 (see FIGS. 6(A), 6(B)) of the body panel 21, an end portion (outer circumferential border) thereof abuts against a surface of the body panel 21.

FIGS. 6(A), 6(B) are schematic cross-sectional views showing conditions wherein the hole plug is placed in the body panel. When the hole plug 1 is placed in the body panel 21, as shown in FIG. 6(A), a user inserts the leg portion 3 of the hole plug 1 into the hole 22 provided in the body panel 21. In the leg portion 3, the maximum outer diameter (based on a standard of an end of the locking claw 14) of the outer tube 12 is set larger than a diameter of the hole 22. If a user inserts the hole plug 1 in the insertion direction, each locking claw 14 is pressed inwardly by an inner circumferential surface of the hole 22. Thereby, in the leg portion 3, a lower portion side thereof is elastically deformed, and displaced to the inside, so that the leg portion 3 is inserted into the hole 22.

In this case, the rib 15 supporting the locking claw 14 from the rear side (inside) is provided so as to be tilted relative to the radial direction, so that when the locking claw is pressed, the rib 15 is easily elastically deformed. Thereby, even in a case where a width (distance between the inner tube 11 and the outer tube 12) of the annular groove 13 is relatively small, a necessary displacement amount of the leg portion 3 (the locking claw 14 and a surrounding portion thereof) can be ensured. Moreover, since the rib 15 is connected relative to the outer tube 12 at a position which is offset from a center of the locking claw 14, as shown in FIG. 5, a predetermined clearance (an area G where the rib 15 does not exist) is formed inside the annular groove 13 of the rear side of the locking claw 14 so as to be capable of ensuring further large displacement amounts of the locking claw 14 and the surrounding portion thereof.

When the leg portion 3 is inserted up to a predetermined position and the placement of the hole plug 1 is completed, as shown in FIG. 6(B), the leg portion 3 returns to an approximately original state from a deformation state of FIG. 6(A), and comes to a state wherein the locking claw 14 is locked in a circumferential border portion (here, an end face 21a of the body panel 21) of the hole 22. At this time, due to an elastic returning force of the rib 15, the outer circumferential surface of the outer tube 12 bumps into the inner circumferential surface of the hole 22. Thereby, a user can obtain an excellent control quality, so that placing workability improves, and also, a high pullout force is achieved. Also, at this time, the outer tube 12 comes to a state wherein the outer circumferential surface of the outer tube 12 is firmly attached to the inner circumferential surface of the hole 22, so that an excellent water stop ability can be obtained. As shown in FIG. 4, thickness of the inner tube 11 is set relatively large, and the thickness of the outer tube 12 is set relatively small. Thereby, due to the outer tube 12 which can be easily deformed, an attaching ability relative to the hole 22 can be enhanced, and also due to the inner tube 11 which is difficult to be deformed, the locking claw 14 can be stably supported by the rib 15.

Also, in a placement completed state shown in FIG. 6(B), an end portion of the flange portion 4 abuts against an upper surface 21b of the body panel 21, so that the body panel 21 is in a state of being clamped between the flange portion 4 and the locking claw 14. Thereby, a placement state relative to the body panel 21 of the hole plug 1 is stably retained. As shown in FIG. 4, the flange portion 4 includes a cross-sectional surface whose end becomes thin toward the outside, so that an end (free end) side thereof easily deforms elastically along the upper surface 21b of the body panel 21. Thereby, a contacting area with the upper surface 21b increases, so that a high attaching ability (i.e., water stop ability) can be obtained.

Figure 7:
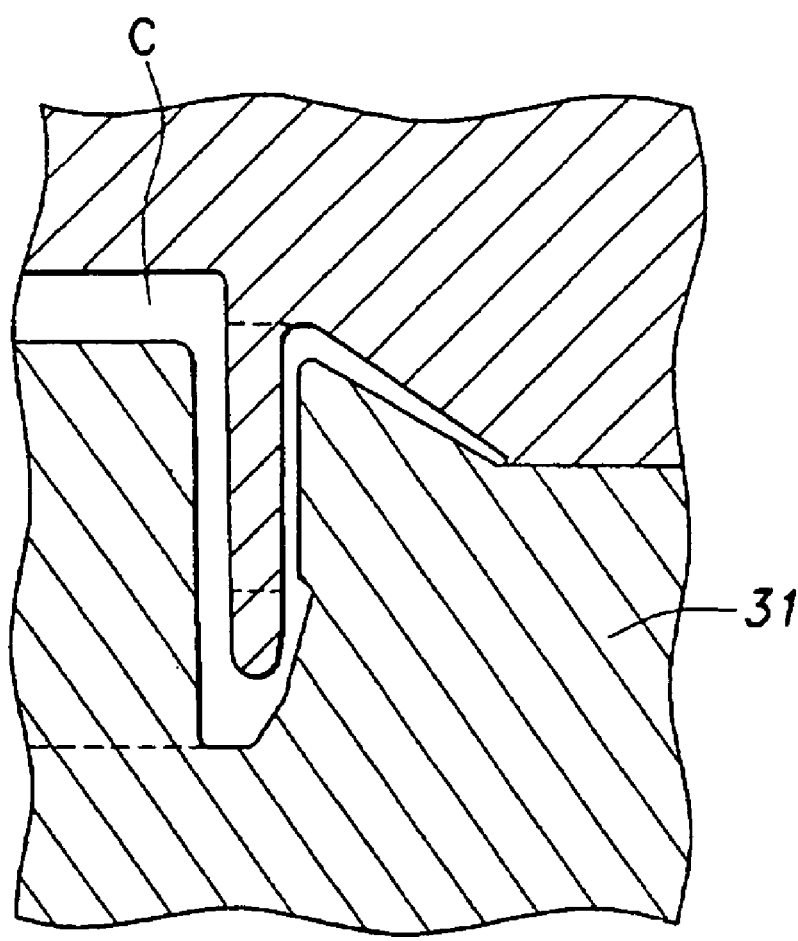
FIG. 7 is a schematic view showing a rough structure of a mold when the hole plug is molded.

FIG. 7 is a schematic view showing a rough structure of a mold when the hole plug is molded. The hole plug is integrally formed by injecting well-known thermoplastic resin (polyethylene and the like) into the inside of a cavity C of a mold 31 in accordance with a well-known method. As mentioned above, the hole plug is structured such that the rib is tilted relative to the radial direction, so that when a molded article thereof is demolded from the mold 31 by force, the locking claw in the outer tube and the surrounding portion thereof are easily displaced to the inside, and a load (shear force and the like) wherein the locking claw receives is reduced. Thereby, damages on the locking claw at a molding time can be prevented. Also, since the rib is easily elastically deformed relative to a pressing force from a locking claw side, damages on the rib itself can be prevented. In this case, as mentioned above, the rib is constituted so as to be connected relative to the outer tube at the position which is offset from the center of the locking claw, so that at a time of being pulled out by force, the further large displacement amounts of the locking claw and the surrounding portion thereof can be ensured. Accordingly, there is an advantage that a load in which the locking claw and the rib receive is effectively reduced.

Incidentally, a damage preventing effect of the locking claw at the above-mentioned time of being demolded from the mold is obtained in the same manner even when the hole plug, which has been once placed in the hole of the body panel, is removed. Specifically, there is an advantage that the hole plug with the above-mentioned structure can maintain an excellent placing ability even when the hole plug is reused (a locking force never decline due to the damages on the locking claw and the like).

Although the present invention has been explained in detail based on a specific embodiment, the embodiment is only an illustrated example and is not limited to the above-mentioned embodiment. For example, as long as the rib of the hole plug according to the present invention is tilted at least relative to the direction heading to the center of the locking claw from the center of the hole plug, the other shapes, numerical quantities, dispositions and the like can be variously modified. Also, two walls (the inner tube 11 and the outer tube 12 in the embodiment) wherein the rib interconnects are not necessarily required to be a tube shape. Also, in the hole plug according to the present invention, a placing subject is not limited to the hole on the above-mentioned body panel, and can be a hole provided in an optional plate-like member. In the above-mentioned embodiment, the circumferential border portion of the hole where the locking claw is locked includes an L-shaped cross-sectional surface. However, plate thickness of the body panel may be structured so as to be increased to a degree in which the locking claw can be locked.

EXPLANATION OF SYMBOLS

1 Hole plug 2 Head portion 3 Leg portion 4 Flange portion 11 Inner tube (first wall) 12 Outer tube (second wall) 13 Annular groove 14 Locking claw 15 Rib 21 Body panel (plate-like member) 22 Hole 31 Mold

What is claimed is:
1. A hole plug comprising:
a head portion, and
a leg portion projecting from the head portion, the hole plug blocking a hole provided in a plate member by inserting the leg portion into the hole,
wherein the leg portion comprises:
a first wall;
a second wall facing the first wall;
ribs interconnecting the first wall and the second wall; and
locking claws provided on an outer circumferential surface of the second wall such that when the leg portion is inserted into the hole, the locking claws are locked in a circumferential border of the hole, and
wherein the ribs are disposed at portions corresponding to positions of the locking claws, and in viewing from an insertion direction of the leg portion, the ribs are tilted relative to a direction heading to a center of the locking claws from a center of the hole plug.

2. A hole plug according to claim 1, wherein the ribs are connected to the second wall at positions offset from the center of the locking claws in viewing from the insertion direction of the leg portion.

3. A hole plug according to claim 1, wherein the first wall is connected to the head portion at one end side thereof, and connected to the second wall at the other end side thereof, and the second wall has a cylindrical shape.

4. A hole plug according to claim 3, further comprising a flange portion connected to an upper portion of the second wall, the flange portion abutting against the plate member when the leg portion is inserted into the hole.

* * * * *